Feb. 21, 1961 J. J. KERLEY, JR., ET AL 2,972,459
VIBRATION AND SHOCK ISOLATOR
Filed Dec. 22, 1955 4 Sheets-Sheet 1
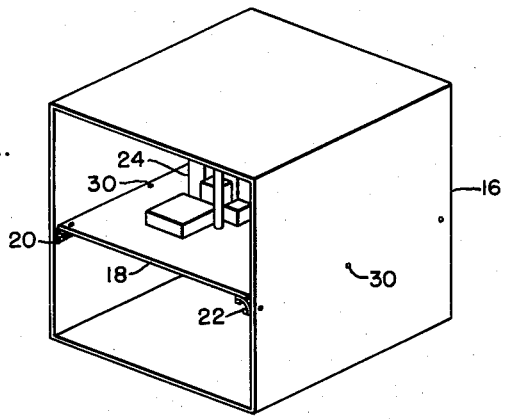
Fig. IA.
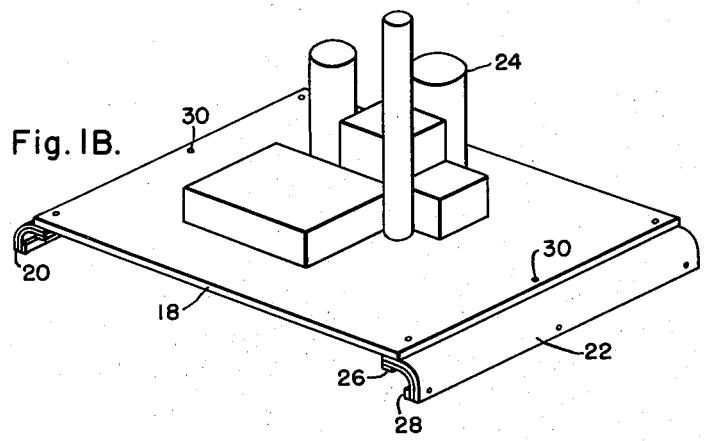
Fig. IB.
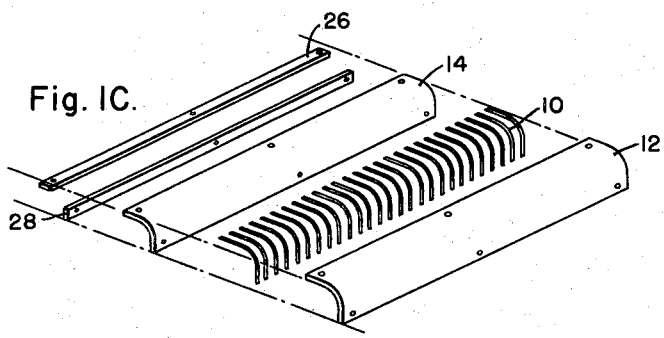
Fig. IC.
WITNESSES
*Robert C. Baird*
*T. N. Murray*
INVENTORS
James J. Kerley, Jr., Raymond G. Hartenstein,
Robert M. Sando & Milton F. Valenta.
BY
*F. E. Browder*
ATTORNEY

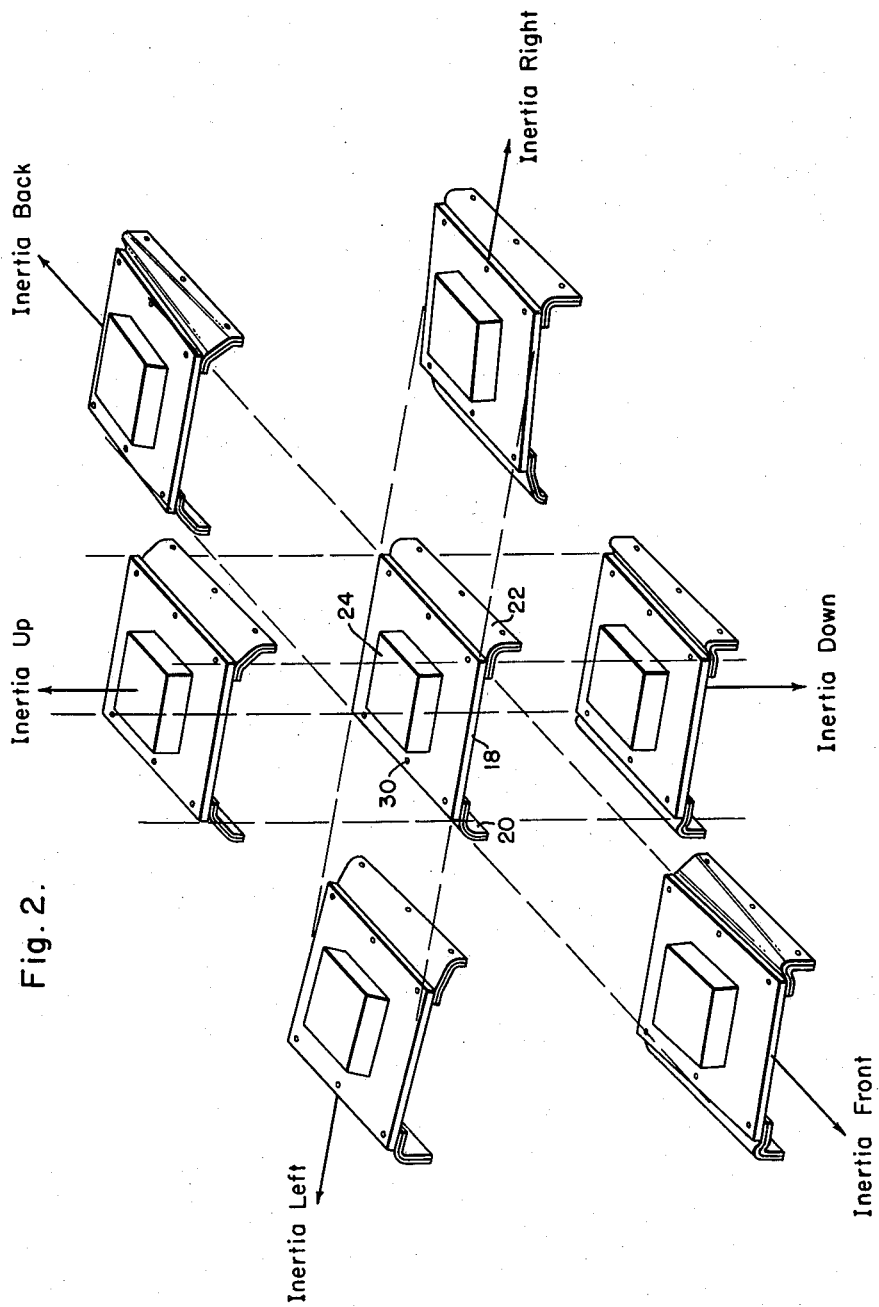

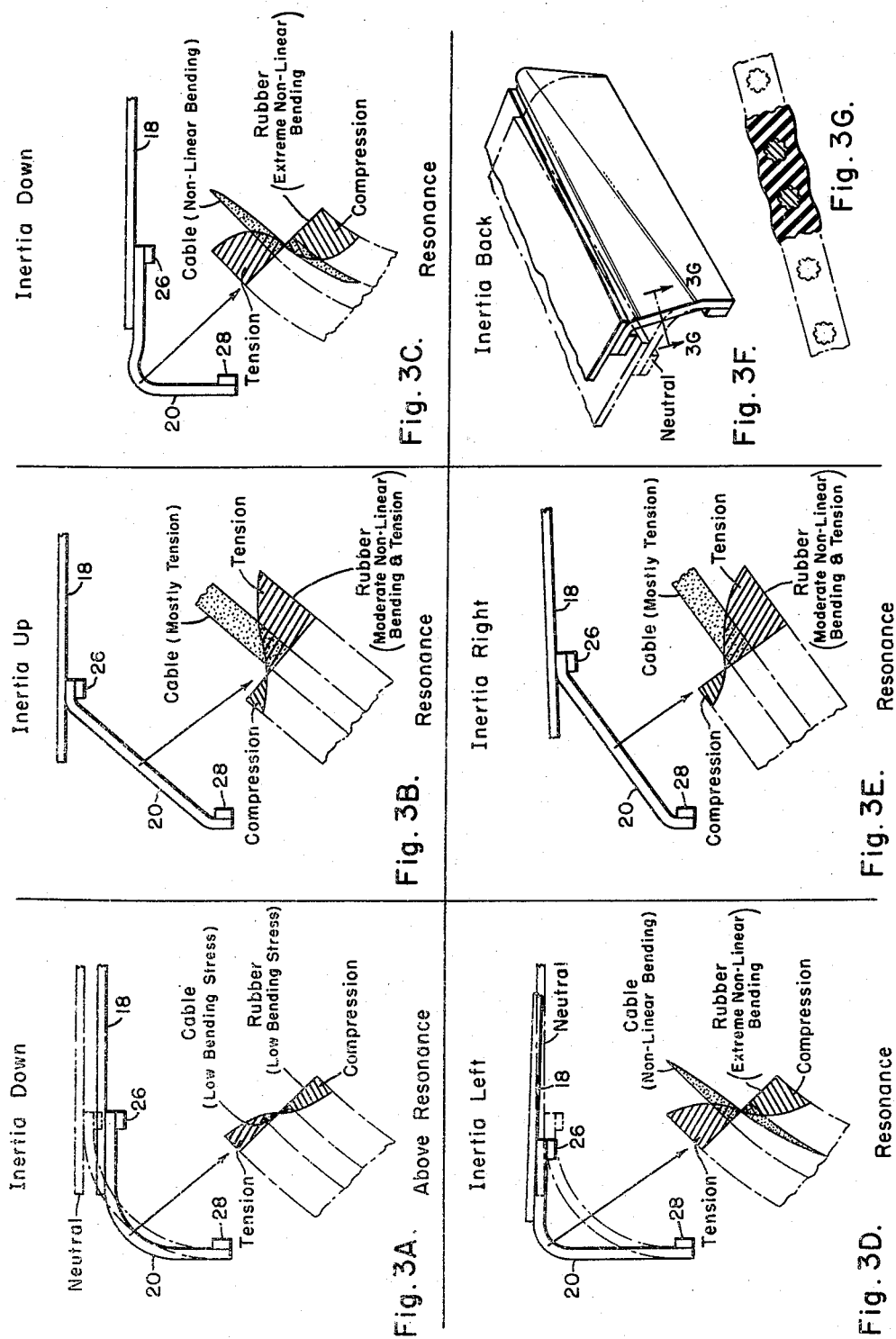

United States Patent Office 2,972,459
Patented Feb. 21, 1961

2,972,459

VIBRATION AND SHOCK ISOLATOR

James J. Kerley, Jr., Cheverly, Raymond G. Hartenstein, Ferndale, Robert M. Sando, Baltimore, and Milton F. Valenta, Millersville, Md., assignors to Westinghouse Electric Corporation, East Pittsburgh, Pa., a corporation of Pennsylvania Filed Dec. 22, 1955, Ser. No. 554,889

6 Claims. (Cl. 248—20)

This invention relates to means for preventing or damping transmission of vibration and shock from one body to another and, more particularly, to apparatus capable of effectively damping transmission of vibration and shock in all three planes over a wide range of vibration frequencies and loads.

In modern missiles, vehicles, airplanes and ships, performance characteristics have been limited seriously because of damaging vibration and shock loads. More specifically, the electronic apparatus in this high speed moving equipment has been failing due to the detrimental effects of vibration and shock loads. Prior to this invention vibration and shock mounts had been proposed for isolating or damping vibrations. These mounts, however, were not able to effectively isolate vibration in all three planes under environmental conditions present in modern equipment. In addition, prior vibration isolators were not adaptable to wide weight variations; and thus, the load had to be stipulated carefully within limits as a small variation in load would materially change the natural frequency of the mount.

It is a primary object of this invention to provide a new and improved mount for isolating or damping vibration and shock. More specifically, it is an object of the invention to provide a mount capable of isolating vibrations and shocks of high energy content in all three planes over a wide range of frequencies and loads.

As will become apparent from the following detailed description, the vibration and shock isolating means of the invention (called a "flex-cable isolator") comprises a plurality of parallel cables embedded in a sheet of elastic material such as rubber or plastic. The ends of the isolator are connected to the members which are to be isolated in a manner such that the elastic sheet assumes the shape of a quadrant of a circle. With this configuration, elastic bending of the rubber and cable is experienced under low inputs; whereas, under high inputs, resonance is curtailed by non-linear bending and tension in both the rubber and cable. This motion accounts for vibration isolation in two planes. Isolation in the third plane is achieved since the parallel flexible cables allow compression of the mount along the surface of the aforesaid elastic sheet.

Under actual tests, one of the isolators incorporating the principles of this invention has been able to cope with steady-state loads as high as 10 "g" (i.e., 10 times the acceleration due to gravity) at resonance with a maximum output of 18 "g" from the isolator. The same mount was subjected to 50 and higher "g" input loads at sixty cycles per second and above with the output at a level of three or four "g". It was given a shock load of 250 "g" without bottoming (i.e. full compression) and without transmitting any high frequency vibrations. High frequency vibrations are not transmitted through the isolator in any plane and deflections are kept to a minimum. It is possible with this isolator to use components of air-borne electronic equipment with much less rigid configurations. Circuits previously thought impossible due to microphonic problems can now be utilized. As an example, electronic packages with these new mounts can be dropped from five to six feet on concrete without damaging equipment.

Although the present flex-cable isolator was designed primarily for use with air-borne electronic equipment, it is by no means limited thereto. By modification, the isolator can also be used as a mount for guns, refrigerators, fans, and blowers, or as a suspension system for automobiles or other vehicles, or any other installation where vibration and shock are a problem.

Futher objects and features of the invention will become apparent from the following detailed description taken in connection with the accompanying drawings which form a part of this specification and in which:

Figures 1A and 1B are illustrations of a typical assembly employing the flex-cable isolator mount of the invention;

Fig. 1C is an exploded view illustrating the construction of the flex-cable isolator per se;

Fig. 2 is a three-dimensional view of a flex-cable isolator assembly illustrating its ability to isolate vibration and shock in three planes;

Figs. 3A to 3G illustrate the internal stress patterns set up in the isolator for various loading conditions.

Figure 4:
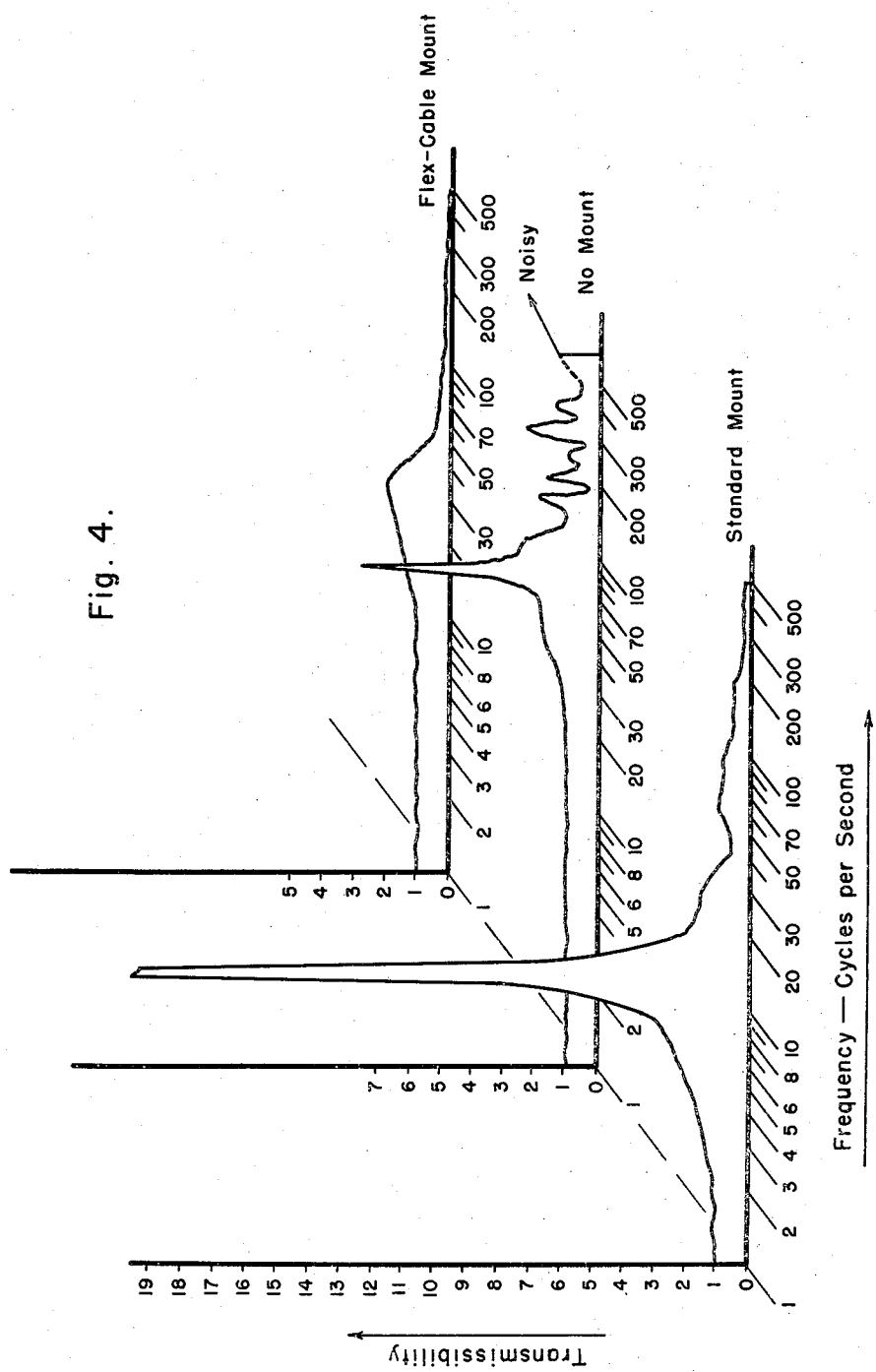
Fig. 4 comprises a series of graphs comparing the performance of the isolator of the present invention with conventional vibration isolating mounts and with the case where no vibration isolation is employed.

Referring to Figs. 1A, 1B and 1C, the flex-cable isolator shown comprises a series of parallel cables 10 of stainless steel and/or other material such as Phosphor bronze which is sandwiched between two sheets of rubber or other elastic material 12 and 14. The size and number of the cables will, of course, depend upon the weight requirements of a particular application. It has been found, however, that for mounting conventional electronic equipment 7 x 7⅜₄ inch stainless steel cable is satisfactory. The type of rubber material used for sheets 12 and 14 will depend upon the particular application at hand. Temperature, humidity and other environmental requirements may dictate the use of a particular material. In one application which was found to work satisfactorily, Saran (trademark) or silicone rubber was employed. The method of manufacture of the flex-cable isolator can be reduced to two forms. One form is to glue the cable between two pieces of elastic material under pressure and heat. The higher the pressure and the higher the temperature, the better the bond. The second method is to mould the elastic material under pressure and heat. Obviously, any manufacturing process may be used as long as the final product is a series of parallel flexible members embedded in a composite sheet of elastic material.

A typical assembly incorporating the flex-cable isolator is shown in Figs. 1A and 1B. The box 16 is subject to vibration and shock. Within box 16 is a plate 18 secured to the side of the box by two flex-cable isolators 20 and 22. Mounted on the plate 18 are weights 24 which represent electronic or other equipment. The ends of the flex-cable isolators are secured to the plate 18 and box 16, respectively, by means of backing plates 26 and 28 and rivets or bolts, several of which are indicated by the numeral 30.

With this construction exceptionally good vibration isolation in all three planes is achieved. The method of isolation performed by the mount may best be understood by reference to Figs. 2 and 3. Fig. 2 shows the motion of the mount under any conceivable load in any direction, whereas the stress patterns in the rubber and cable are shown in Fig. 3. The motion of the isolator for up, down, right and left inertia loads is relatively straight forward and can be readily understood from an examination of Fig. 2. Isolation in the third plane (front and back) is achieved by a longitudinal stretching of the mount as shown.

All of the diagrams of Fig. 3, except the first, graphically illustrate the bending stresses in the rubber and cable at the resonant frequency of the two members connected by the mount. When the frequency of vibration is above resonance in the vertical plane (Fig. 3A), internal bending stresses are produced which are primarily low internal tension and compression in the rubber and cable. When the frequency of vibration is at resonance and the inertia is in an upward direction (Fig. 3B), tension is caused primarily in the cable with a moderate amount of bending in the rubber. When the inertia is downward at resonance (Fig. 3C), non-linear bending in both the cable and the rubber is produced. When the inertia is toward the left at resonance (Fig. 3D), an internal stress pattern is produced similar to that produced by the inertia being downward at resonance. There is, however, a slight rotation of the plate mounting for the equipment. For the left-hand mount there is mostly tension in the mount when the inertia is toward the right at resonance (Fig. 3E). When the inertia is toward the back at the resonant frequency (Fig. 3F), there is tension in the front cables and plastic bending in the back cables and rubber. The internal stress pattern is similar to that previously discussed. It can be seen that under these conditions the rubber rotates with a resulting shear flow transmitted to the cables and a corresponding humping of the rubber (Fig. 3G). This action is primarily responsible for the attentuation of high frequency vibrations above the first mode.

The precise nature of the damping could be either in the cable or the plastic material. The amount of damping can vary in the plastic and cable at different frequencies. Actual studies indicate that primary damping occurs in the cable due to the temperature rise of this material during vibration. The problems of heat transfer, shear flow, intermolecular friction, intermaterial friction, and friction among the cable strands enter into this complex problem.

A mathematical expression for the internal stress distribution in the isolator cannot be calculated with the techniques applicable to the theory of elasticity or a simplified method of structural analysis. Both of these systems depend upon homogeneous materials, with constant temperature throughout a uniform load rate, a near linear stress-strain curve, friction boundary conditions accountable, and a clear understanding of the exact relative shear flow between component parts. Applied mathematics through proper testing techniques may be employed to get approximate stress distributions of the mount.

Referring to Fig. 4, transmissibility versus frequency is plotted for a standard vibration isolator mount, no mount, and the present flex-cable isolator mount. "Transmissibility" may be defined as the ratio of output "g" loads to input "g" loads. The conventional or standard mount will "bottom" at approximately 10 cycles per second. At this point transmissibility increases sharply. Bottoming does not occur with the flex-cable isolator. When no mount is used the transmissibility is greatest at resonance (approximately 90 cycles per second), and above resonance it fluctuates over a wide range. The desirability of the flex-cable isolator is evident from the graph. Its transmissibility characteristics are extremely low and constant for all frequencies. At higher frequencies, transmissibility is almost negligible. Bending rather than shear transmission of loads at high frequencies is an essential feature for high frequency isolation.

Although the invention has been described in connection with a certain specific embodiment, it should be readily apparent to those skilled in the art that various changes in form and arrangement of parts can be made to suit requirements without departing from the spirit and scope of the invention.

We claim as our invention:

1. Apparatus for damping transmission of vibration and shock from one member to another, said apparatus comprising a sheet of resilient material, a plurality of flexible metal cables embedded in and extending transversely of said sheet at longitudinally spaced-apart intervals therealong, means for fastening one extremity of each of said cables in planar alignment to one of said members, and means for fastening the other extremity of said cables in planar alignment to the other of said members.

2. Apparatus for damping transmission of vibration and shock between two members having respective plane surfaces substantially perpendicular to each other, said apparatus comprising a sheet of resilient material, a plurality of flexible metal cables embedded in and extending transversely of said sheet at longitudinally spaced-apart intervals therealong, means for fastening one extremity of each of said cables in substantially planar alignment to the plane surface on one of said members, and means for fastening the other extremity of each of said cables in substantially planar alignment to the plane surface on the other of said members.

3. In combination with two relatively-movable members, a plurality of spaced-apart parallel-arranged flexible metal cable elements, and means securing each of said cable elements in regular extension between said members for vibration-damping support-transmitting interconnection therebetween.

4. In combination with a horizontal member to be supported and a vertical member for support, a plurality of parallel-arranged flexible cable elements each secured at its one end to said horizontal member and at its opposite end to said vertical member, said cable elements extending horizontally-outward and vertically-downward from said horizontal member to said vertical member as a vibration-damping support-transmitting connection between the two members.

5. In combination with two relatively-movable members, a plurality of spaced-apart parallel-arranged flexible stranded steel cable elements, and means securing each of said cable elements in angular extension between said members for vibration-damping support-transmitting interconnection therebetween.

6. In combination with two relatively-movable members, a plurality of spaced-apart parallel-arranged flexible stranded stainless steel cable elements, and means securing each of said cable elements in angular extension between said members for vibration-damping support-transmitting interconnection therebetween.

References Cited in the file of this patent

UNITED STATES PATENTS

| | | |
|---|---|---|
| 1,671,764 | Dickey | May 29, 1928 |
| 2,224,648 | Haadem | Dec. 10, 1940 |
| 2,689,464 | Wurtz | Sept. 21, 1954 |
| 2,693,925 | Mirly | Nov. 9, 1954 |
| 2,723,538 | Heidorn | Nov. 15, 1955 |
| 2,728,617 | Edwards | Dec. 27, 1955 |

UNITED STATES PATENT OFFICE
CERTIFICATION OF CORRECTION

Patent No. 2,972,459 February 21, 1961

James J. Kerley, Jr., et al.

It is hereby certified that error appears in the above numbered patent requiring correction and that the said Letters Patent should read as corrected below.

Column 4, line 36, for "regular" read --- angular ---.

Signed and sealed this 29th day of August 1961.

(SEAL)
Attest:

ERNEST W. SWIDER
Attesting Officer

DAVID L. LADD
Commissioner of Patents